United States Patent
Mashue et al.

(10) Patent No.: US 7,730,627 B2
(45) Date of Patent: Jun. 8, 2010

(54) METHOD AND DEVICE FOR MEASURING GEAR TOOTH WEAR

(75) Inventors: Aaron John Mashue, Simpsonville, SC (US); Ryan Spencer Close, Greenville, SC (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 12/247,476

(22) Filed: Oct. 8, 2008

(65) Prior Publication Data
US 2010/0083516 A1  Apr. 8, 2010

(51) Int. Cl.
*G01M 13/02* (2006.01)
(52) U.S. Cl. .................... 33/501.7; 33/501.11
(58) Field of Classification Search ................ 33/501.7, 33/501.11
See application file for complete search history.

(56) References Cited

U.S. PATENT DOCUMENTS

| | | | | |
|---|---|---|---|---|
| 2,657,469 A | * | 11/1953 | Brown | 33/501.14 |
| 3,193,936 A | | 7/1965 | Schnitzer | |
| 3,589,018 A | * | 6/1971 | Thompson et al. | 33/501.12 |
| 3,813,952 A | * | 6/1974 | Fehrenbacher | 74/84 R |
| 4,185,391 A | | 1/1980 | Roley | |
| 4,608,862 A | * | 9/1986 | Klukowski et al. | 73/162 |
| 4,641,877 A | | 2/1987 | Merrill | |
| 4,651,434 A | * | 3/1987 | Haynes | 33/481 |
| 4,769,917 A | * | 9/1988 | Bertz et al. | 33/501.7 |
| 4,811,490 A | * | 3/1989 | Ueda et al. | 33/501.14 |
| 4,962,590 A | * | 10/1990 | Ambrose | 33/501.14 |
| 5,083,458 A | * | 1/1992 | DeGeorge et al. | 73/162 |
| 5,392,644 A | * | 2/1995 | Frazier | 73/162 |
| 5,461,797 A | * | 10/1995 | Royer et al. | 33/501.7 |
| 5,624,301 A | * | 4/1997 | Lenz et al. | 451/47 |
| 6,047,606 A | * | 4/2000 | Sibole | 73/865.8 |
| 7,322,794 B2 | | 1/2008 | LeMieux et al. | |
| 7,458,776 B2 | | 12/2008 | Gonzalez et al. | |
| 2007/0058854 A1 | | 3/2007 | Caskey et al. | |
| 2008/0159863 A1 | | 7/2008 | Uphues | |

* cited by examiner

*Primary Examiner*—Christopher W Fulton
(74) *Attorney, Agent, or Firm*—James McGinness, Esq.; Armstrong Teasdale LLP

(57) ABSTRACT

A method and device for measuring an amount of wear on a flank of a gear tooth is provided. The method includes positioning a template comprising a first template tooth adjacent a gear comprising a first gear tooth. The method also includes adjusting the position of the template in a rotational direction with respect to a known rotational reference point of the gear, adjusting the position of the template in an axial direction with respect to a known axial reference point of the gear, and adjusting the position of the template in a radial direction with respect to a known radial reference point of the gear. The method further includes measuring an extent of a gap between an edge of the first template tooth and an adjacent flank of the first gear tooth, wherein the gap corresponds to the amount of wear on the flank.

20 Claims, 7 Drawing Sheets

METHOD AND DEVICE FOR MEASURING GEAR TOOTH WEAR

FIELD OF THE INVENTION

The subject matter described herein generally relates to gear teeth and, more particularly, to a method and device for measuring gear tooth wear.

BACKGROUND OF THE INVENTION

At least some known wind turbines include a rotor having multiple blades. The rotor blades are sometimes coupled to a hub that is in turn coupled to a housing, or nacelle. The nacelle is positioned on top of a base, for example, a truss or tubular tower. The rotor blades transform mechanical wind energy into induced blade lift forces that further induce a mechanical rotational torque. The induced torque is used to drive one or more generators, subsequently generating electric power, or alternatively to pump a fluid and/or grind a substance.

At least some known wind turbines have a mechanism to adjust a pitch angle of each rotor blade. The pitch angle is an angle that determines each of the blades' orientation about a longitudinal axis of the blade. At least some known pitch adjustment mechanisms include a pitch motor operating a pinion gear that acts on a ring gear coupled to the blade.

In at least some known wind turbines, a plurality of teeth of the ring gear may become worn over time, decreasing an efficiency and reliability of the pitch adjustment mechanism. Moreover, an extent of such gear tooth wear is difficult to quantify. Templates are known that may be inserted between the flanks of adjacent gear teeth, allowing a wear of the gear teeth to be estimated by comparing a distance between the adjacent flanks to a known template width. However, such known templates provide only an estimation of a combined wear on both flanks of the two adjacent teeth, rather than a measurement of the wear on an individual tooth flank. Moreover, such known templates do not provide a repeatable measurement at a consistent location on each tooth flank that may be used to compare wear between two different times for a given gear tooth, between one gear tooth and another gear tooth on the same gear, or between gear teeth on similar gears associated with different blades or different wind turbines. Accordingly, it would be desirable to develop a method and/or a system that facilitates a repeatable and reliable measurement of the wear at a consistent location on each flank of each gear tooth.

BRIEF DESCRIPTION OF THE INVENTION

In one aspect, a method of measuring an amount of wear on a flank of a gear tooth is provided. The method includes positioning a template comprising a first template tooth adjacent a gear comprising a first gear tooth. The method also includes adjusting the position of the template in a rotational direction with respect to a known rotational reference point of the gear, adjusting the position of the template in an axial direction with respect to a known axial reference point of the gear, and adjusting the position of the template in a radial direction with respect to a known radial reference point of the gear. The method further includes measuring an extent of a gap between an edge of the first template tooth and an adjacent flank of the first gear tooth, wherein the gap corresponds to the amount of wear on the flank.

In another aspect, a template for measuring an amount of wear on a first gear tooth of a gear is provided. The template includes a first template tooth configured to fit in a space defined between the first gear tooth and a second gear tooth adjacent the first gear tooth, such that an edge of the first template tooth abuts a flank of the first gear tooth with substantially no gaps when the flank is in an unworn condition. The template is configured to be repeatably positionable at a consistent location with respect to an axial direction defined with respect to the gear, a radial direction defined with respect to the gear and a rotational direction defined with respect to the gear. A measurable gap between the edge and the flank corresponds to the amount of wear on the first gear tooth.

In yet another aspect, a system for comparing gear tooth wear is provided. The system includes a plurality of gears of substantially similar size and shape, with each gear having a first gear tooth, a second gear tooth adjacent the first gear tooth, and a space defined therebetween. The system also includes a template having a first template tooth configured to fit in the space such that an edge of the first template tooth abuts a flank of the first gear tooth with substantially no gaps when the flank is in an unworn condition. The template is configured to be repeatably positionable at a consistent location on each of the plurality of gears with respect to an axial direction defined with respect to each gear, a radial direction defined with respect to each gear and a rotational direction defined with respect to each gear. A measurable gap between the edge and the flank corresponds to an amount of wear on the first gear tooth of each gear of the plurality of gears.

DETAILED DESCRIPTION OF THE INVENTION

The method and system described herein facilitate a repeatable and reliable measurement of the wear at a consistent location on each flank of each gear tooth. Such method and system includes the use of a template that is positionable with respect to a consistent reference point on a gear. The template includes at least a first template tooth configured to fit in a space defined between a first and second tooth of a gear. Specifically, the template is positionable at a consistent location with respect to an axial direction, a radial direction and a rotational direction defined with respect to the gear. A technical effect of the template is to allow a repeatable measurement of the wear on each tooth flank that may be used to compare gear tooth wear at two different times for a given gear tooth on a single gear, or between one gear tooth and another gear tooth on the same gear, or between gear teeth on a plurality of gears of a substantially similar size and shape.

Figure 1:
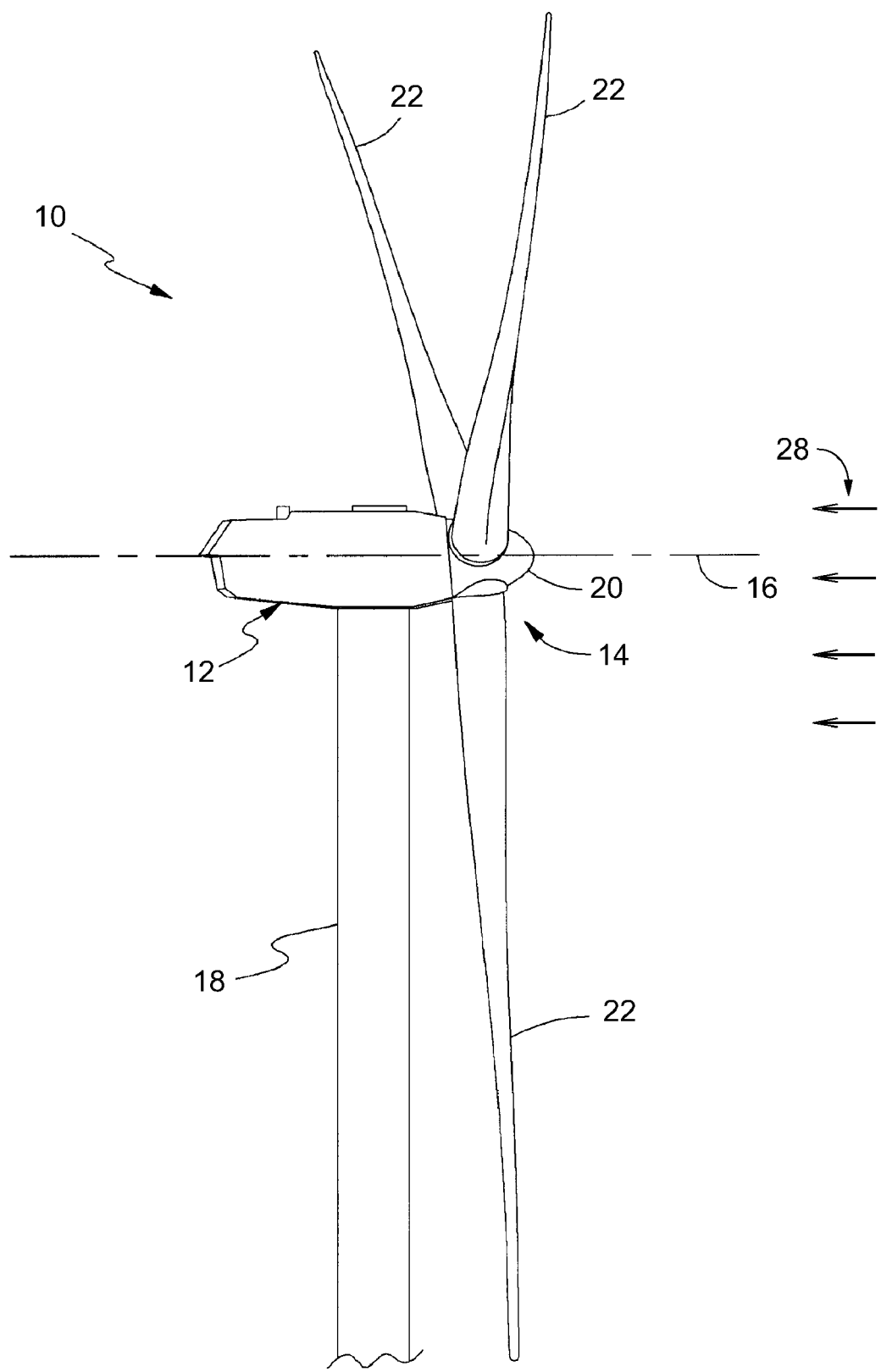
FIG. 1 is a perspective view of an exemplary wind turbine.

FIG. 1 is a perspective view of an exemplary embodiment of an exemplary wind turbine 10. In the exemplary embodiment, wind turbine generator 10 is a horizontal axis wind turbine. Alternatively, wind turbine 10 may be a vertical axis wind turbine. Wind turbine 10 may be coupled to an electrical load (not shown), such as, but not limited to, a power grid (not shown), and may receive electrical power therefrom to drive operation of wind turbine 10 and/or its associated components. Alternatively, wind turbine 10 may be a "wind mill" that produces mechanical energy used, for example, to pump a fluid and/or grind a substance Wind turbine 10 includes a body 12, sometimes referred to as a "nacelle," and a rotor (generally designated by 14) coupled to body 12 for rotation with respect to body 12 about an axis of rotation 16. In the exemplary embodiment, nacelle 12 is mounted on a tower 18. The height of tower 18 is any suitable height enabling wind turbine 10 to function as described herein. Rotor 14 includes a hub 20 and a plurality of blades 22 (sometimes referred to as "airfoils") extending radially outwardly from hub 20 for converting wind energy into rotational energy. Although rotor 14 is described and illustrated herein as having three blades 22, rotor 14 may include any number of blades 22.

Figure 2:
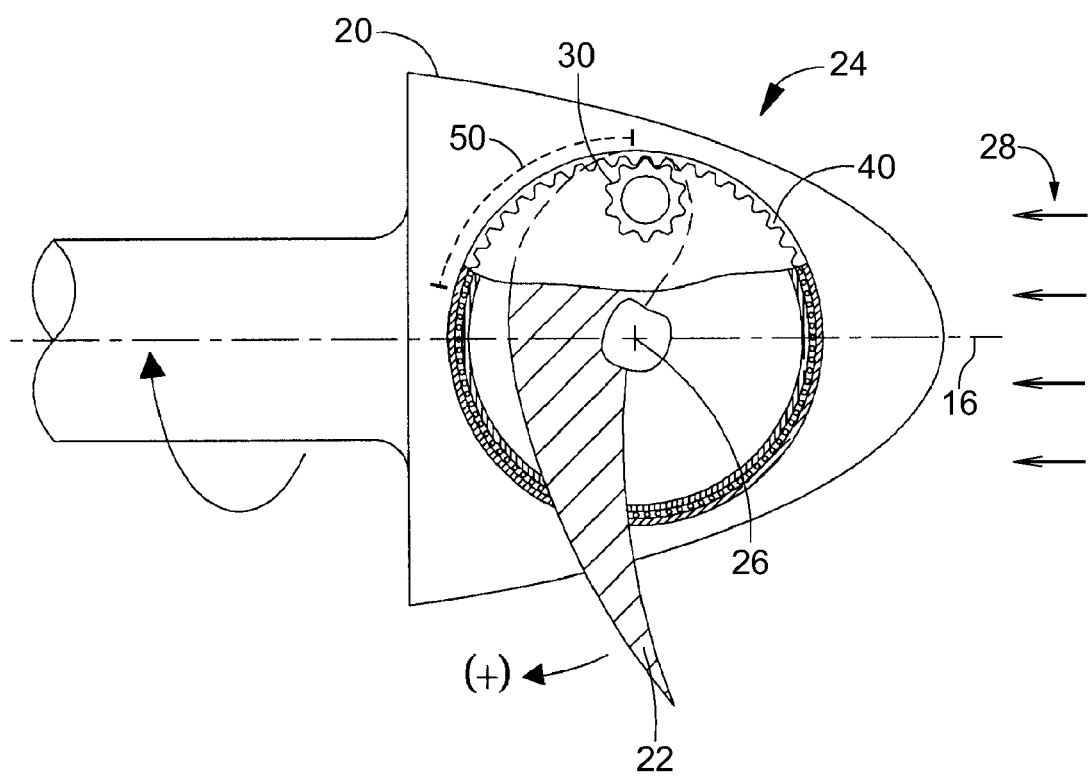
FIG. 2 is a schematic view of an exemplary blade pitch control system that may be used with the wind turbine generator shown in FIG. 1.

FIG. 2 is a schematic view of an exemplary blade pitch control system 24 within hub 20 that may be used to set a pitch angle of a rotor blade 22 shown in FIG. 1. Pitch control system 24 rotates blade 22 (shown in cross-section in FIG. 2) about a longitudinal axis 26 of blade 22 to thereby change the pitch of blade 22. Rotor blade 22 is shown in FIG. 2 at approximately a zero pitch angle, or "power," position. Another defined position of rotor blade 22 is a "full feather" pitch position (not shown), in which blade 22 is oriented approximately 90 degrees in the positive (+) direction about longitudinal axis 26 from the zero pitch position shown in FIG. 2. In general, increasing the pitch angle of blade 22 about longitudinal axis 26 towards the fully feathered position decreases an amount of induced lift from a wind 28 on blade 22, and, conversely, decreasing the pitch angle of blade 22 towards the power position increases the amount of induced lift from wind 28 on blade 22.

In the exemplary embodiment, pitch control system 24 includes a pinion gear 30. When wind turbine 10 is in normal operation, pinion gear 30 is driven by one or more actuators (not shown), such as, but not limited to, electrical motors, hydraulic cylinders, springs, and/or servomechanisms. Pinion gear 30 cooperates with a ring gear 40, through an interaction of gear teeth as described below and shown in FIG. 3, such that rotation of pinion gear 30 results in proportionate rotation of ring gear 40. Ring gear 40 is coupled to blade 22 such that rotation of ring gear 40 rotates blade 22 about longitudinal axis 26 to thereby change the pitch of blade 22. In the exemplary embodiment, in the course of normal operation of wind turbine 10, the pitch of blade 22 may be adjusted through a range of angles between the power (approximately zero degree) position and the full feather (approximately ninety degree) position. Accordingly, in the course of such operation, an approximately ninety-degree arcuate portion 50 of ring gear 40 may come into contact with pinion gear 30. In alternative embodiments, a different portion of ring gear 40, including potentially the entire ring gear 40, may come into contact with pinion gear 30.

Figure 3:
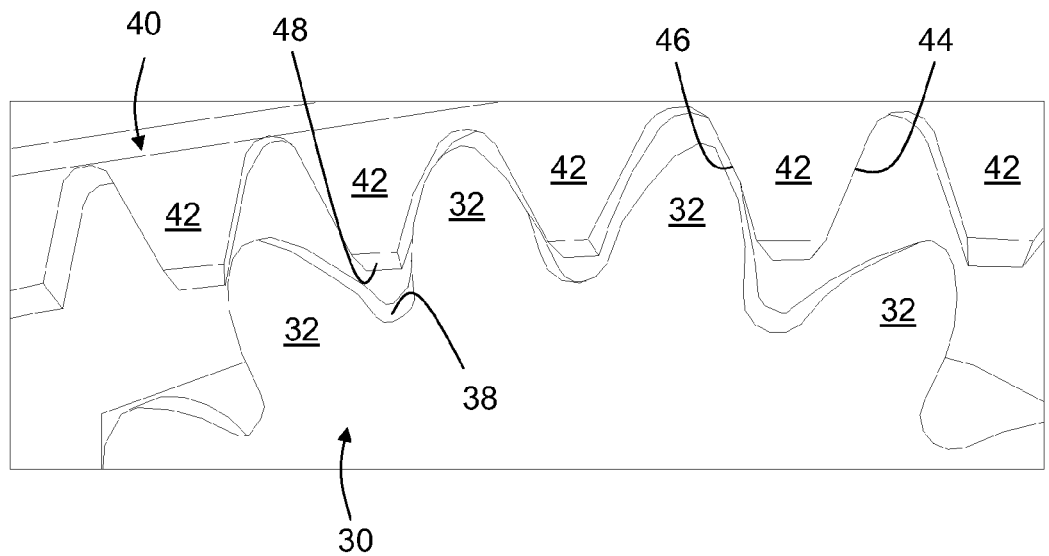
FIG. 3 is a pictorial view of an exemplary interaction of a plurality of teeth of a pinion gear with a plurality of teeth of a ring gear.

FIG. 3 is a pictorial view of an interaction of a plurality of teeth 32 of pinion gear 30 with a plurality of teeth 42 of ring gear 40. Rotation of pinion gear 30 in either direction causes the pinion gear teeth 32 to act on the ring gear teeth 42 such that ring gear 40 rotates proportionately in the same direction as pinion gear 30. Each of the plurality of ring gear teeth 42 has a forward flank 44 and a rear flank 46. For clarity in FIG. 3, forward flank 44 and rear flank 46 are indicated with reference characters in FIG. 3 for only one ring gear tooth 42, but they are present on every ring gear tooth 42 in the exemplary embodiment. Repeated forward-and-backward rotation of ring gear 40 by pinion gear 30 results in a wearing away of material from the forward flanks 44 and rear flanks 46 of ring gear teeth 42. Due to a clearance between a top land 48 of each ring gear tooth 42 and a bottom land 38 of each pinion gear tooth 32, no direct wear occurs on ring gear tooth top lands 48. In the exemplary embodiment, the wear on forward flanks 44 and rear flanks 46 occurs only on teeth 42 located within the portion 50 of ring gear 40 that interacts with pinion gear 30 for pitch positioning over the approximately ninety degrees between the power and full feather positions. Other ring gear teeth 42 located outside portion 50 do not come into contact with pinion gear teeth 32, and thus do not experience wear on their respective forward flanks 44 and rear flanks 46. In alternative embodiments, the wear on forward flanks 44 and rear flanks 46 occurs on more, or all, teeth 42 of ring gear 40.

Figure 4:
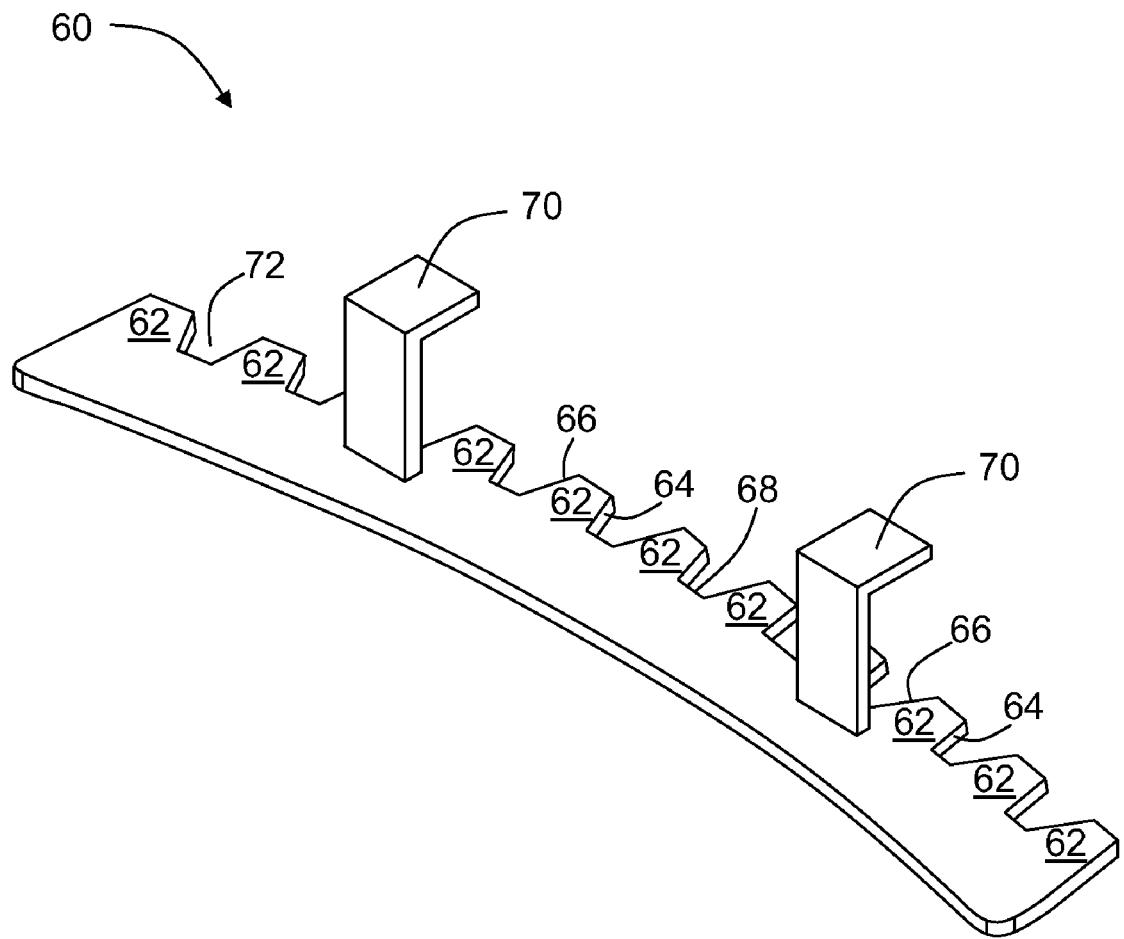
FIG. 4 is a schematic view of an exemplary template for measuring wear on the forward flanks and rear flanks of a plurality of ring gear teeth.
Figure 5:
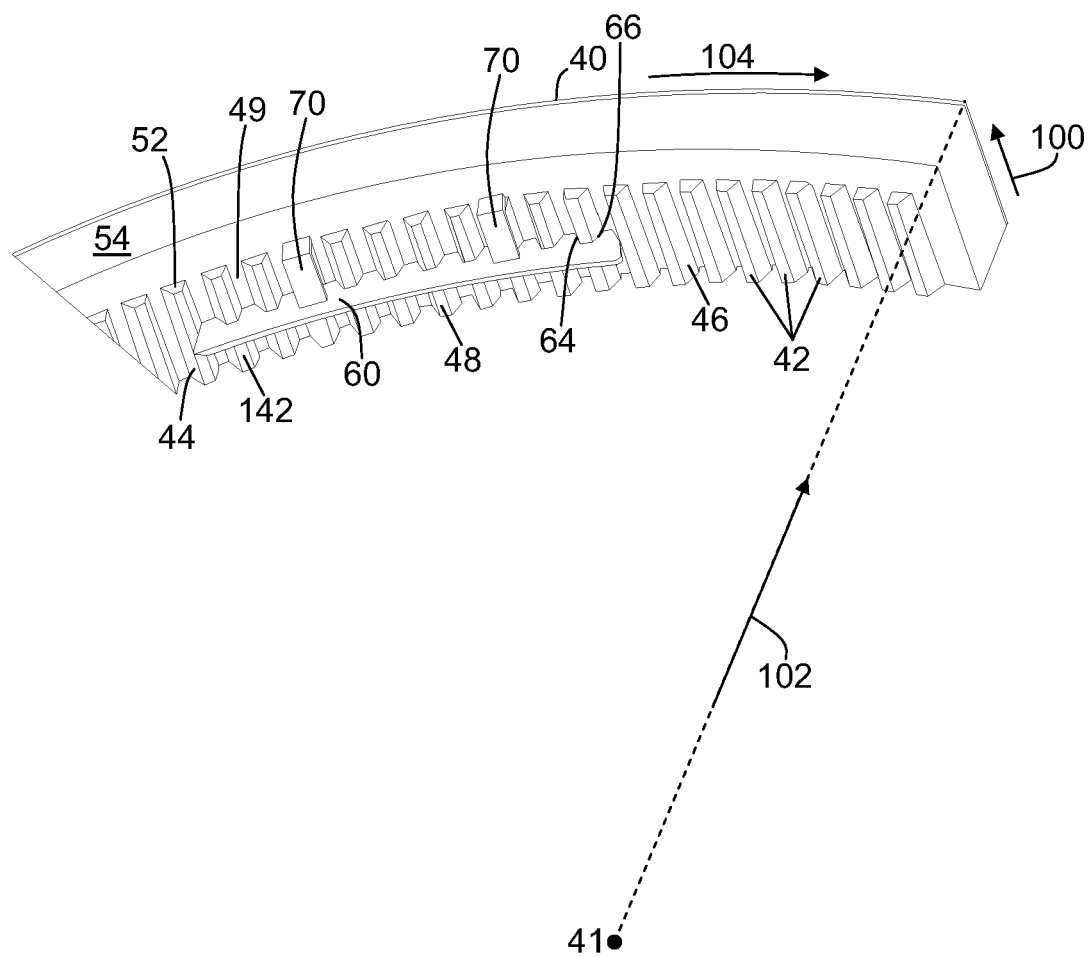
FIG. 5 is a pictorial view of the exemplary template of FIG. 4 fitted adjacent the ring gear of FIG. 3

FIG. 4 is a schematic view of an exemplary template 60 for measuring wear on the forward flanks 44 and rear flanks 46 of the plurality of ring gear teeth 42. FIG. 5 is a pictorial view of an exemplary embodiment of template 60 fitted adjacent to ring gear 40. Template 60 includes at least a first template tooth 62 configured to fit in a space defined between a first ring gear tooth 42 and a second ring gear tooth 42, such that an edge of the first template tooth 62 abuts a flank of the first gear tooth 42 with substantially no gaps when the flank is in an unworn condition.

More specifically, in the exemplary embodiment, template 60 includes a plurality of teeth 62 that are shaped to fit in respective spaces between adjacent ring gear teeth 42 when template 60 is fitted adjacent to ring gear 40. If the ring gear teeth 42 are in a new or unworn condition, a forward edge 64 of each template tooth 62 fits snugly, with no gaps, against the respective forward flank 44 of a ring gear tooth 42, and a rear edge 66 of each template tooth 62 fits snugly, with no gaps, against the corresponding rear flank 46 of a ring gear tooth 42. Moreover, as material on the forward flanks 44 and rear flanks 46 of gear teeth 42 is worn away through interaction with pinion gear teeth 32, measurable gaps will become apparent between forward edges 64 and forward flanks 44, and between rear edges 66 and rear flanks 46, when template 60 is fitted adjacent to ring gear 40. For clarity in FIG. 4, forward edge 64 and rear edge 66 are indicated with reference characters in FIG. 4 for only two template teeth 62, but they are present on every template tooth 62 in the exemplary embodiment.

In certain embodiments, template 60 is positionable with respect to a consistent reference point on ring gear 40. More specifically, in certain embodiments, template 60 is repeatably positionable at a consistent location with respect to an axial direction 100, which lies parallel to longitudinal axis 26 (shown in FIG. 2), a radial direction 102 and a rotational direction 104 defined as shown in FIG. 5 with respect to a center 41 of ring gear 40.

In the exemplary embodiment, template 60 includes at least one leg 70 that facilitates consistent positioning of template 60 with respect to axial direction 100. Each leg 70 is shaped to contact a respective end 52 of a gear tooth 42 when template 60 is positioned adjacent ring gear 40. Legs 70 are sized such that, when legs 70 are each in contact with a respective end 52 as shown in FIG. 5, template teeth 62 are located at a known location of ring gear teeth 42 with respect to axial direction 100. In alternative embodiments, template 60 may, for example but not by way of limitation, be visually aligned with ends 52, or may have a shape that facilitates contact or visual alignment with an axial edge 54 or other known axial reference point of ring gear 40.

Moreover, in the exemplary embodiment, consistent alignment of template 60 with respect to radial direction 102 is facilitated by a plurality of bottom lands 68 of template teeth 62 that are shaped to contact respective top lands 48 of gear teeth 42 when template 60 is fitted adjacent to ring gear 40. As described previously, in normal operation, no direct wear occurs on ring gear teeth top lands 48. As a result, ring gear teeth top lands 48 lie at an approximately constant radial distance from longitudinal axis 26 of ring gear 40 over the life of ring gear 40, and template 60 may be consistently located with respect to radial direction 102 by bringing template teeth bottom lands 68 into contact with respective ring gear teeth top lands 48. In alternative embodiments, template 60 may, for example but not by way of limitation, have a shape that facilitates contact or visual alignment with ring gear teeth bottom lands 49 or other known radial reference point of ring gear 40.

Further, in the exemplary embodiment, consistent alignment of template 60 with respect to rotational direction 104 is facilitated by locating an unused ring gear tooth 142 within a first template space 72 when template 60 is fitted adjacent to ring gear 40. First template space 72 is selected to be the space defined between any two adjacent template teeth 62. In the exemplary embodiment, as shown in FIG. 4, first template space 72 is the space defined between the two endmost template teeth 62. As described previously, in normal operation in the exemplary embodiment, no wear occurs on ring gear teeth 42 that lie outside portion 50 of ring gear 40. Unused ring gear tooth 142 is selected from among the ring gear teeth 42 lying outside portion 50. As a result, the forward flank 44 and rear flank 46 of unused ring gear tooth 142 remain undeformed in a direction parallel to rotational direction 104 over the life of ring gear 40. Therefore, template 60 may be consistently located with respect to rotational direction 104 by locating unused ring gear tooth 142 within the first template space 72 when template 60 is fitted adjacent to ring gear 40. In alternative embodiments, template 60 may, for example but not by way of limitation, have a shape that facilitates positioning template 60 with respect to contact or visual alignment with some other known rotational reference point of ring gear 40.

Figure 6:
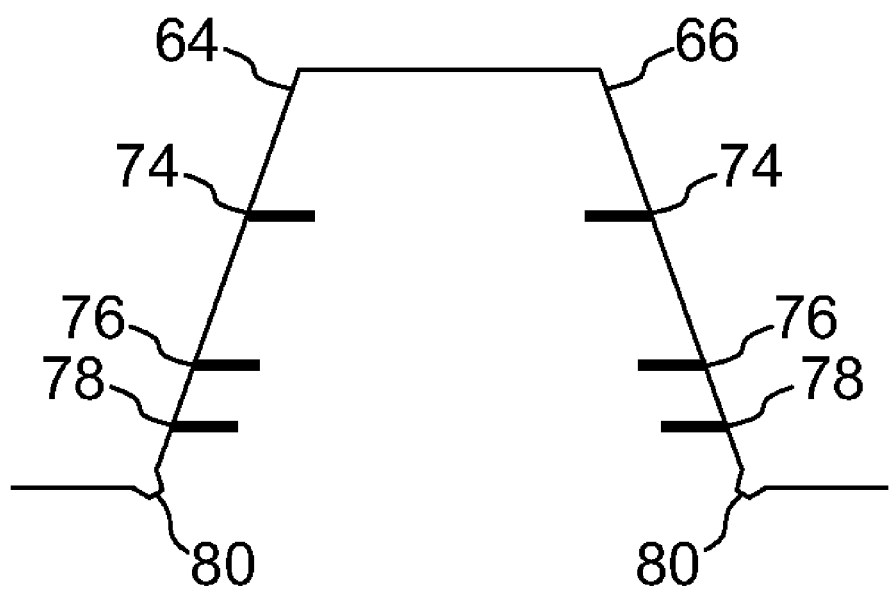
FIG. 6 is a schematic view of an exemplary template tooth.

FIG. 6 is a schematic view of an exemplary template tooth 62. In the exemplary embodiment, template tooth 62 has indicators such as markings 74, 76, and 78 on forward edge 64 and/or on rear edge 66. Marking 74 is positioned on template tooth 62 such that, when template 60 is positioned adjacent ring gear 40 as shown in FIG. 5, marking 74 corresponds to a one-half dedendum location on the forward flank 44 and/or rear flank 46 of a ring gear tooth 42 adjacent template tooth 62. Similarly, marking 76 is positioned on template tooth 62 such that marking 76 corresponds to a pitch line location on the forward flank 44 and/or rear flank 46 of a ring gear tooth 42 adjacent template tooth 62, and marking 78 is positioned on template tooth 62 such that marking 78 is corresponds to a one-half addendum location on the forward flank 44 and/or rear flank 46 of a ring gear tooth 42 adjacent template tooth 62. In alternative embodiments, markings 74, 76, and 78 are positioned in different locations along forward edge 64 and/or on rear edge 66, and/or a different number of markings is used. Markings 74, 76, and 78 facilitate measuring wear on ring gear teeth 42 at consistent corresponding locations on each ring gear tooth 42. For example, but not by way of limitation, a feeler gage (not shown) may be inserted between template tooth 62 and an adjacent ring gear tooth 42 at marking 76 to measure a wear of the ring gear tooth 42 at the pitch line.

Also with reference to FIG. 6, in the exemplary embodiment, a radius 80 is defined at the base of forward edge 64 and rear edge 66. When template 60 is positioned adjacent ring gear 40 as shown in FIG. 5, radius 80 facilitates avoiding an interference of template 60 with any deformities or protrusions (not shown) that may have formed at an edge between a top land 48 and a forward flank 44 and/or a rear flank 46 of a ring gear tooth 42.

Figure 7:
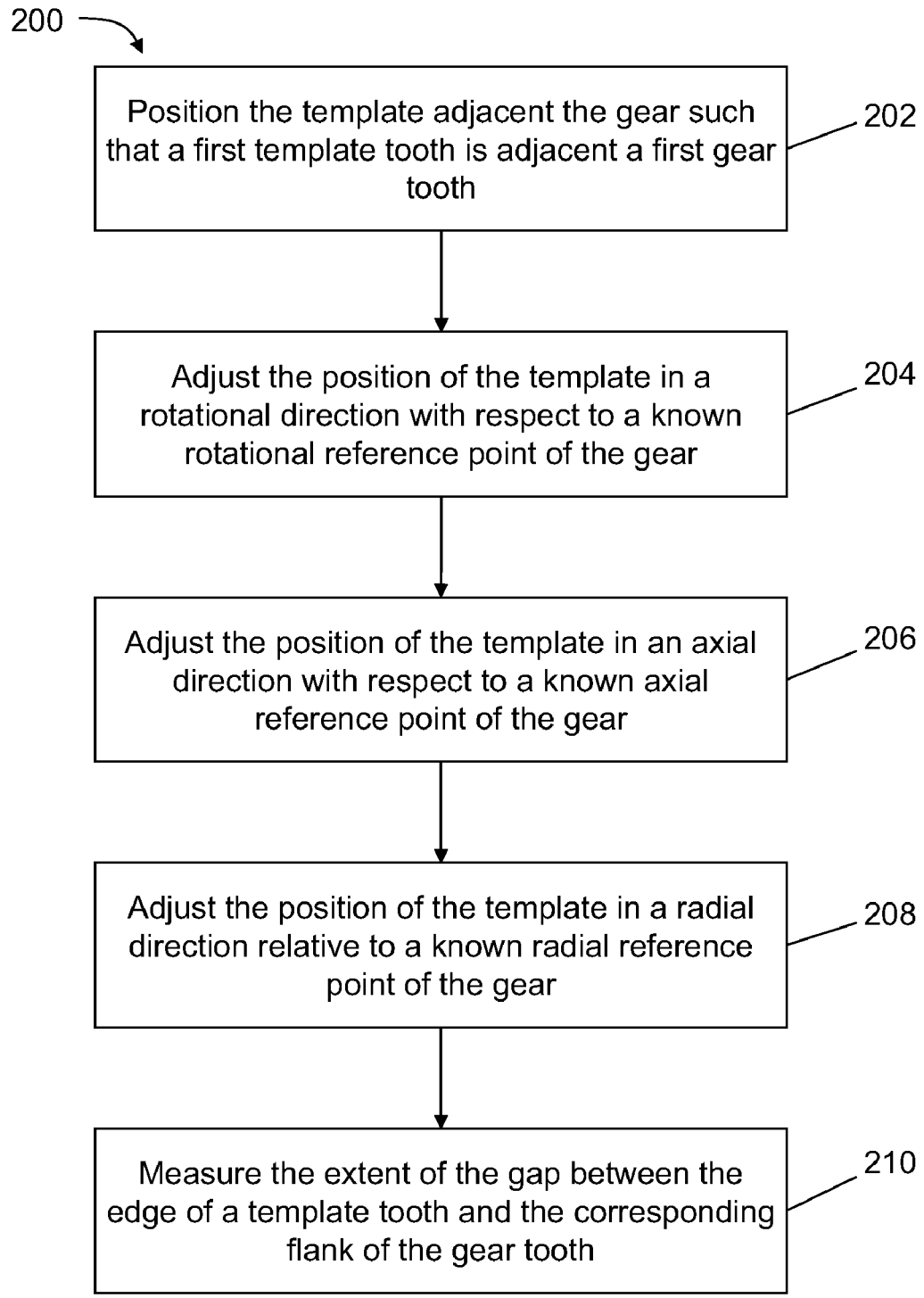
FIG. 7 is a flow chart of an exemplary method for measuring wear on the forward flank and/or rear flank of a gear tooth using the template shown in FIG. 4.

FIG. 7 is a flow chart of an exemplary method 200 for measuring a wear on the flanks of a ring gear tooth 42 using template 60. In the exemplary method 200, the user (not shown) making the wear measurements positions 202 template 60 adjacent ring gear 40 such that at a first template tooth 62 is adjacent a first gear tooth 42. The user adjusts 204 the position of template 60 in the rotational direction 104 with respect to a known rotational reference point of ring gear 40. For example, with reference to FIGS. 4 and 5, the user adjusts 204 the position of template 60 such that unused ring gear tooth 142 lies within the first template space 72. Further, the user adjusts 206 the position of template 60 in the axial direction 100 with respect to a known axial reference point of ring gear 40. For example, the user adjusts 206 the position of template 60 such that at least one leg 70 contacts a respective end 52 of a gear tooth 42. The user further adjusts 208 the position of template 60 in the radial direction 102 with respect to a known radial reference point of ring gear 40. For example, the user adjusts 208 the position of template 60 such that each template tooth bottom land 68 contacts a respective ring gear tooth top land 48. The user then measures 210 an extent of a gap, if any, between the forward edge 64 of the first template tooth 62 and the corresponding forward flank 44 of the first ring gear tooth 42, and/or between a rear edge 66 of the first template tooth 62 and a corresponding rear flank 46 of the first ring gear tooth 42. For example, the user measures 210 the extent of the gap by inserting a feeler gage (not shown) between the forward edge 64 and the corresponding forward flank 44, and/or between a rear edge 66 and a corresponding rear flank 46. As described previously, the measured gap corresponds to a wearing away of material on the forward flank 44 and/or rear flank 46 of the first gear tooth 42 through interaction with pinion gear teeth 32.

Exemplary embodiments of methods and devices for measuring gear tooth wear are described above in detail. The methods and devices are not limited to the specific embodiments described herein, but rather, components of systems and/or steps of the methods may be utilized independently and separately from other components and/or steps described herein. For example, the steps of the methods may be performed in any appropriate order, and the methods may also be used in combination with gears in other applications, and are not limited to practice with only a wind turbine ring gear as described herein. Rather, the exemplary embodiment can be implemented and utilized in connection with many other gear applications.

While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of measuring an amount of wear on a flank of a gear tooth, said method comprising:
   positioning a template comprising a first template tooth adjacent a gear comprising a first gear tooth;
   adjusting the position of the template in a rotational direction with respect to a known rotational reference point of the gear;
   adjusting the position of the template in an axial direction with respect to a known axial reference point of the gear;
   adjusting the position of the template in a radial direction with respect to a known radial reference point of the gear; and
   measuring an extent of a gap between an edge of the first template tooth and an adjacent flank of the first gear tooth, the gap corresponds to the amount of wear on the flank.

2. A method in accordance with claim 1 wherein the gear comprises a second gear tooth, said positioning a template comprises positioning the template such that the first template tooth fits in a space defined between the first gear tooth and the second gear tooth.

3. A method in accordance with claim 1 wherein the template further comprises a second template tooth, a third template tooth, and a first template space defined therebetween, and the gear further comprises an unused gear tooth, said adjusting the position of the template in a rotational direction with respect to a known rotational reference point of the gear comprises positioning the unused ring gear tooth within the first template space.

4. A method in accordance with claim 1 wherein said adjusting the position of the template in a rotational direction with respect to a known rotational reference point of the gear comprises visually aligning the template with the known rotational reference point of the gear.

5. A method in accordance with claim 1 wherein the template comprises at least one leg and the gear comprises a second gear tooth, said adjusting the position of the template in an axial direction with respect to a known axial reference point of the gear comprises adjusting the position of the template such that the at least one leg contacts an end of the second gear tooth.

6. A method in accordance with claim 1 wherein said adjusting the position of the template in an axial direction with respect to a known axial reference point of the gear comprises visually aligning the template with an axial edge of the gear.

7. A method in accordance with claim 1 wherein the first gear tooth comprises a top land and the first template tooth comprises a bottom land, said adjusting the position of the template in a radial direction with respect to a known radial reference point of the gear comprises adjusting the position of the template in a radial direction such that the first template tooth bottom land contacts the first gear tooth top land.

8. A method in accordance with claim 1 wherein said measuring an extent of a gap between an edge of the first template tooth and an adjacent flank of the first gear tooth further comprises inserting a feeler gage into the gap at a location defined by a marking on the first template tooth.

9. A template for measuring an amount of wear on a first gear tooth of a gear, said template comprising a first template tooth configured to fit in a space defined between the first gear tooth and a second gear tooth adjacent the first gear tooth such that an edge of said first template tooth abuts a flank of the first gear tooth with substantially no gaps when the flank is in an unworn condition, said template is configured to be repeatably positionable at a consistent location with respect to an axial direction defined with respect to the gear, a radial direction defined with respect to the gear and a rotational direction defined with respect to the gear, wherein a measurable gap between said edge and the flank corresponds to the amount of wear on the first gear tooth.

10. A template in accordance with claim 9 further comprising a second template tooth and a third template tooth defining a first template space therebetween, said first template space configured to accept an unused gear tooth of the gear to facilitate repeatable positioning of said template at the consistent location with respect to the rotational direction.

11. A template in accordance with claim 9 wherein the gear further comprises a rotational reference point, said template further configured for visual alignment with the rotational reference point to facilitate repeatable positioning of said template at the consistent location with respect to the rotational direction.

12. A template in accordance with claim 9 further comprising at least one leg, wherein the gear comprises a third gear tooth, said at least one leg configured to contact an end of the third gear tooth to facilitate repeatable positioning of said template at the consistent location with respect to the axial direction.

13. A template in accordance with claim 9 further configured for visual alignment of said template with an axial edge of the gear to facilitate repeatable positioning of said template at the consistent location with respect to the axial direction.

14. A template in accordance with claim 9 wherein the first gear tooth comprises a top land and said first template tooth comprises a bottom land, said template further configured such that said first template tooth bottom land contacts the first gear tooth top land to facilitate repeatable positioning of said template at the consistent location with respect to the radial direction.

15. A template in accordance with claim 9 wherein said first template tooth further comprises a marking configured to indicate a measurement location.

16. A system for comparing gear tooth wear comprising:
   a plurality of gears of substantially similar size and shape, each gear comprising a first gear tooth, a second gear tooth adjacent the first gear tooth, and a space defined therebetween; and
   a template comprising a first template tooth configured to fit in the space such that an edge of said first template tooth abuts a flank of said first gear tooth with substantially no gaps when said flank is in an unworn condition, said template configured to be repeatably positionable at a consistent location on each of the plurality of gears with respect to an axial direction defined with respect to each gear, a radial direction defined with respect to each gear and a rotational direction defined with respect to each gear, wherein a measurable gap between said edge and said flank corresponds to an amount of wear on said first gear tooth of each gear of said plurality of gears.

17. A system in accordance with claim 16, said template further comprising a second template tooth and a third template tooth defining a first template space therebetween, said first template space configured to accept an unused gear tooth of said gear to facilitate repeatable positioning of said template at the consistent location with respect to the rotational direction.

18. A system in accordance with claim 16, said template further comprising at least one leg, each gear of said plurality of gears comprising a third gear tooth, said at least one leg configured to contact an end of said third gear tooth to facilitate repeatable positioning of said template at the consistent location with respect to the axial direction.

19. A system in accordance with claim 16, said first gear tooth comprises a top land and said first template tooth comprises a bottom land, said template further configured such that said first template tooth bottom land contacts said first gear tooth top land to facilitate repeatable positioning of said template at the consistent location with respect to the radial direction.

20. A system in accordance with claim 16 wherein said first template tooth further comprises a marking configured to indicate a measurement location.

* * * * *